United States Patent
Heule

(10) Patent No.: US 8,708,614 B2
(45) Date of Patent: Apr. 29, 2014

(54) CUTTING KNIFE FOR CHIP-REMOVING CUTTING TOOLS WITH BREAKING NOTCH

(75) Inventor: Heinrich Heule, Au (CH)

(73) Assignee: Heule, ULF

( * ) Notice: Subject to any disclaimer, the term of this patent is extended or adjusted under 35 U.S.C. 154(b) by 953 days.

(21) Appl. No.: 12/690,709

(22) Filed: Jan. 20, 2010

(65) Prior Publication Data

US 2010/0183390 A1 Jul. 22, 2010

(30) Foreign Application Priority Data

Jan. 20, 2009 (DE) .......................... 10 2009 005 275

(51) Int. Cl.
*B23B 29/34* (2006.01)

(52) U.S. Cl.
USPC ........ 407/113; 408/713; 408/173; 408/241 R; 407/120

(58) Field of Classification Search
USPC ........... 408/713, 173, 153; 407/118, 113–116
See application file for complete search history.

(56) References Cited

U.S. PATENT DOCUMENTS

| | | | | |
|---|---|---|---|---|
| 581,474 A * | 4/1897 | Turner | | 76/21 |
| 2,225,326 A * | 12/1940 | Walker | | 407/8 |
| 2,256,847 A * | 9/1941 | Osenberg | | 407/56 |
| 2,886,081 A * | 5/1959 | Cowley | | 408/224 |
| 4,629,372 A * | 12/1986 | Huston | | 407/116 |
| 4,844,670 A * | 7/1989 | Heule | | 408/224 |
| 5,181,810 A * | 1/1993 | Heule | | 408/147 |
| 5,195,404 A * | 3/1993 | Notter et al. | | 76/108.6 |
| 5,277,528 A | 1/1994 | Robinson | | |
| 8,292,553 B2 * | 10/2012 | Robinson et al. | | 408/156 |
| 2004/0250423 A1* | 12/2004 | Yu | | 30/123 |
| 2007/0065240 A1 | 3/2007 | Berger et al. | | |
| 2010/0150672 A1* | 6/2010 | Edler | | 407/120 |

FOREIGN PATENT DOCUMENTS

| | | |
|---|---|---|
| DE | 7928667 | 9/1983 |
| DE | 10246645 | 4/2004 |
| DE | 102004054989 | 5/2006 |
| EP | 1713604 | 2/2005 |
| WO | 2010071549 | 6/2010 |

OTHER PUBLICATIONS

European Patent Office Search Report, European Patent Application No. 09016160.5, dated Jan. 20, 2011, 7 pages.
German Patent and Trademark Office Search Report, German Patent Application Serial No. 102009005275.5, dated Sep. 23, 2009.
Office Action in corresponding Chinese Patent Application No. 201010004662.8 dated Mar. 28, 2013, 4 pages.

\* cited by examiner

*Primary Examiner* — Eric A Gates
*Assistant Examiner* — Paul M Janeski
(74) *Attorney, Agent, or Firm* — Wood, Herron & Evans, LLP

(57) ABSTRACT

A cutting knife for difficult-to-manipulate, chip-removing cutting tools, that is replaceably held in a knife window of a rotary-driven tool shaft of a base body, in which at least one knife holder that is connected to the cutting knife over a predetermined breaking point, and that assists with manipulation, is attached to the cutting knife, and is broken away for the tool shaft to be put to use.

19 Claims, 2 Drawing Sheets

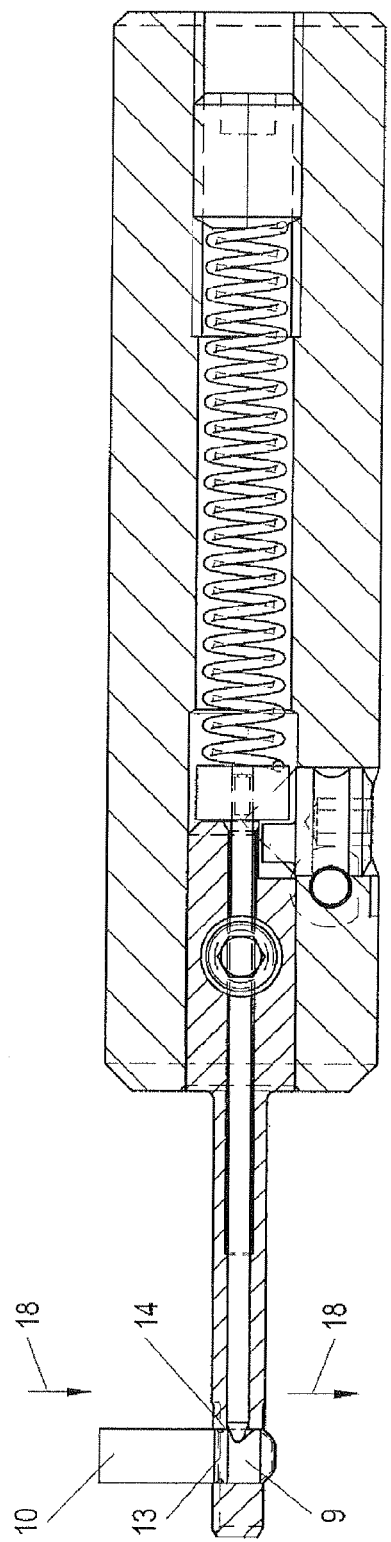
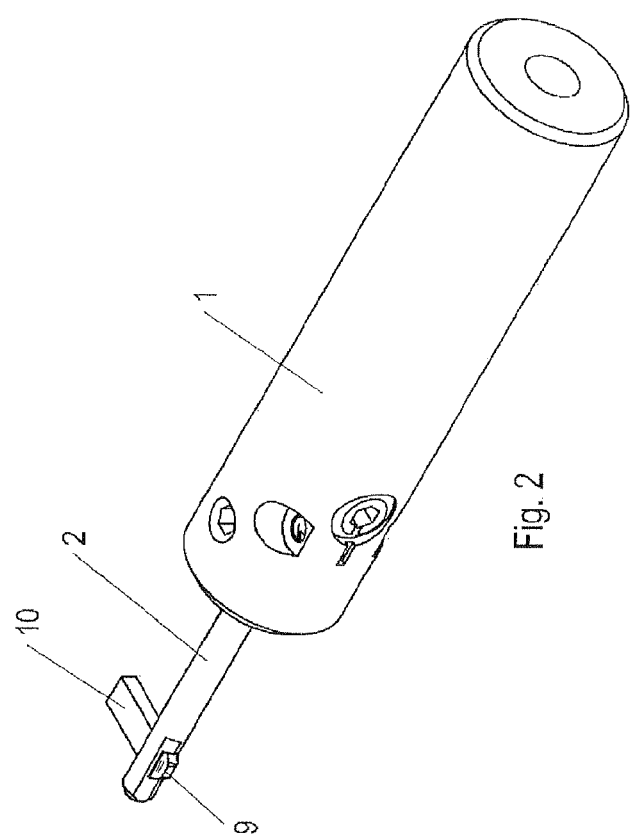

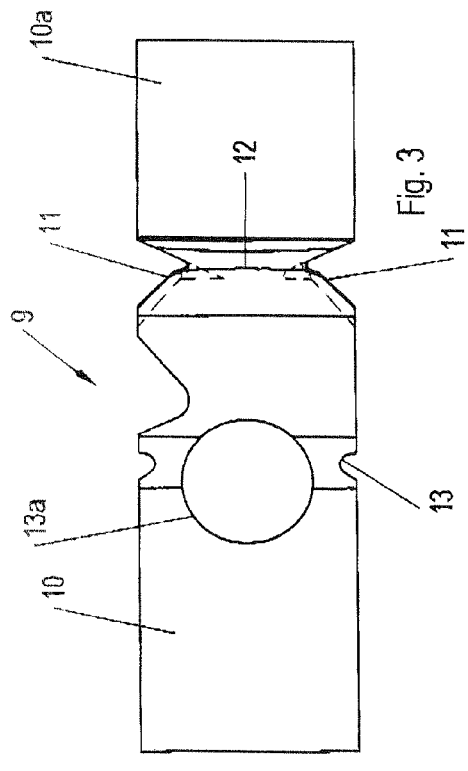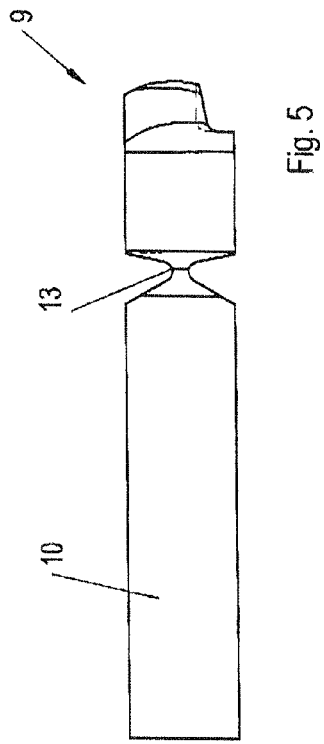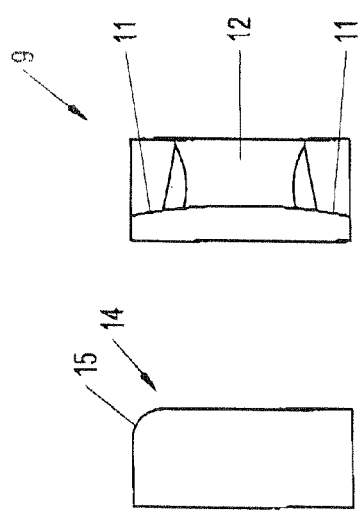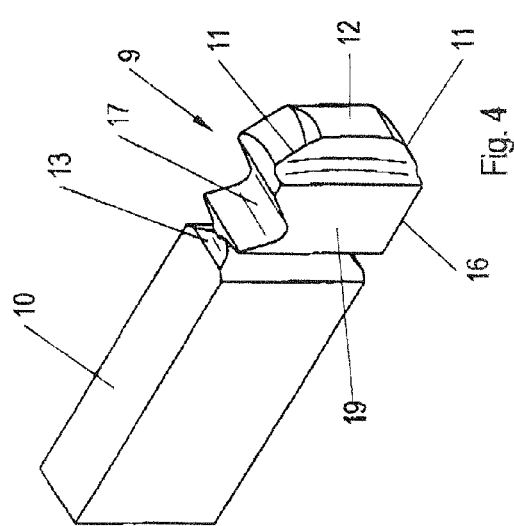

CUTTING KNIFE FOR CHIP-REMOVING CUTTING TOOLS WITH BREAKING NOTCH

The invention relates to a cutting knife for chip-removing cutting tools that are hard to manipulate by hand, according to the generic term of patent claim 1.

Cutting knives for chip-removing cutting tools are used in varied embodiments.

One possible embodiment is shown by the state of the art in the form of our own patent application DE 10 2004 054 989. Such cutting knives are especially used for deburring tools, however also for counter-boring tools, routing tools and milling tools. That revelation shall fully apply to the present invention.

Such cutting knives are smaller than a specific minimum size of, for example, 10 mm, such that their manipulation is made difficult, and there are problems replacing such a relatively small, difficult-to-handle cutting knife in its corresponding tool.

In other applications, it is not exclusively a matter of small knives whose small size makes them difficult to handle, but also problematic assembly relationships, in which a comparatively easily handled knife is to be installed in a hidden or difficult-to-access place in the tool.

In all of these cases, there are problems installing the cutting knife in the desired, correct position in the tool holder itself.

The underlying task of this invention, therefore, is to further develop a cutting knife for chip-removing cutting tools of the type mentioned at the beginning, such that it is easy to manipulate or that it is easy to install in a tool that is difficult to access.

As a solution to the problem posed, the invention is characterized by the technical theory for claim 1.

A significant characteristic of the present invention is that the cutting knife is attached through a predetermined breaking point to at least one knife holder as a manipulation aid.

With the given technical teaching, there is the significant advantage that for the first time it is now possible to manipulate well very small cutting knives of lengths, for example, from 1.9 mm to 5 mm, because according to the invention at a certain place on the cutting knife there is a knife holder that assists manipulation, and that this knife holder is attached over a predetermined breaking point to the knife.

Installing such a cutting knife that is attached to a knife holder according to the invention as a manipulation aid is done in such a way that the cutting knife is inserted with the knife holder that is still mounted through the predetermined breaking point into an opening in the cutting or countersinking tool and is there anchored in the correct position by the mechanism in the cutting or countersinking tool. After the anchoring in the correct position, a short press on the knife holder (which serves as a manipulation aid) stresses the predetermined breaking point by bending it until it breaks. This generally occurs through a short bending of the knife holder, such that the predetermined breaking point then lies inside the tool slot and does not project from the tool. This provides the advantage that the knife holder is broken off only once the knife has been installed in the tool firmly and in the correct position.

Of course, within the framework of the present invention, it remains open where the knife holder sits over the predetermined breaking point on the cutting knife. This can occur at various points.

In a first embodiment it is provided that the knife holder with the predetermined breaking point placed upon it sets on the rear part of the cutting knife, i.e., on the part that is formed opposite the floating radius and the cutting edge.

In another embodiment it can, however, be provided that the knife holder sits above the predetermined breaking point on the front floating radius of the knife, i.e., sits directly on the knife head, and in a third embodiment it can be provided that the knife holder sits on the base of the cutting knife.

In all applications, it is important that it first be provided that the knife is attached to at least one manipulation aid that is attached to a predetermined breaking point with the knife itself.

It is to be understood only as an example, that the knife holder (manipulation aid) be attached to the floating radius, i.e., to the head of the cutting knife itself. For other knives, such as milling cutters or similar knives, such a floating radius can be omitted, and it is important only that the knife holder (manipulation aid)—in this execution example—grip directly to the cutting part of the cutting knife itself and not to another part or to another surface of this cutting knife.

The invention is also not limited to the assembly of a knife holder that sits on one side of the tool. In another execution it can be provided that two knife holders be located on the tool (e.g., the cutting knife), of which each is attached to the tool over a predetermined breaking point. Such an execution is especially suitable if it is provided that the cutting knife be slid in by gripping to the rear knife holder in the insertion direction in the recess on the tool holder. The knife holder running in the insertion direction goes through the insertion opening in the tool holder and emerges on the other side of the tool holder. Thus the cutting knife that is installed in the opening on the tool holder and is now blocked is equipped with two knife holders that lie opposite one another and are preferentially aligned to each other.

To complete the installation, then, one and then the other knife holder is broken off. Such a dual assembly of knife holders is an advantage with especially small tools that are difficult to manipulate.

The invention is not, incidentally, a knife that can be slid radially into a knife window of a tool holder. It makes no difference in which direction the knife can be slid. There are also applications that indicate a knife that is immovably attached in a knife holder but is nonetheless replaceable. In such an application the knife holder itself is formed to be adjustable or pivotable but holds an immovable knife. Such applications should also be considered a part of the invention.

A single, replaceable knife is described for the purpose of simplified description. However, the invention is not limited to this. Any number of knives or other tool inserts can be equipped with the breakaway handle according to the invention.

The object of this invention arises not only from the object of the individual patent claims, but also from the combination of the individual patent claims together.

All of the documentation, including the summary of disclosed data and characteristics, especially the spatial design depicted in the drawings, are claimed to have significance as inventions, as long as they are new individually or in combination in relation to the state of the art.

Below, the invention will be explained in more detail by means of several drawings that depict only one manner of execution. In connection with this, further significant characteristics and advantages significant to the invention arise from the drawings and their descriptions.

Depicted are:

FIG. 1: a schematic of a longitudinal section of a deburring tool with a cutting knife and a knife holder set thereupon, which has not yet been broken away.

FIG. 2: a perspective depiction according to FIG. 1

FIG. 3: an enlarged depiction of the cutting knife with the knife holder placed on it FIG. 4: a perspective depiction of FIG. 3

FIG. 5: a 90-degree rotational view of the assembly according to FIG. 4

FIG. 6: a front view of the cutting side of the knife

FIG. 7: schematic of the top view of a knife window in the tool shaft according to FIG. 1

FIG. 1 briefly explains the operation of a deburring knife, although that is not significant to the present invention. Significant is only that a relatively small knife 9 in a knife window 14 of a tool shaft 2 of a base body 1 is adjustably held.

Here the knife 9 is installed in the knife window 4 and is held by a shaft 3 that is prestressed by a spring, whereby the shaft 3 is prestressed by the pressure spring 4 in the direction of its longitudinal extension. The spring 4 is connected at its rear end to a threaded pin 6, at which the pressure of the pressure spring 4 can be set.

When the clamping screw 5 is loosened, the entire tool shaft 2 can be pulled out of the base body 1.

Furthermore, an eccentric tappet 7 is in place, which can be activated for retracting the shaft 3, so that it disengages from the indentation 17 on the knife 9.

In this way the knife can be replaced very easily. If this replacement is undertaken, the knife falls out of the knife window 14 in the direction of the arrow 18 and must be replaced with a new knife. The replacement process with the help of the new knife and the knife holder 10 attached to it according to the invention is explained by FIG. 1 and by the figures thereafter.

In order to install a new knife into the knife window 14, it is provided that, according to FIGS. 4 to 6, on the rear part of the knife 9 the knife holder 10 is attached, by which the connection is broken by means of a predetermined breaking point 13.

Now the knife 9 with the knife holder 10 fastened on the back according to FIG. 1 is pressed upward in the direction of the arrow 18 onto the knife window 14, and the knife is now slid into the knife window 14. The shaft 3 is still retracted. However, it can also be provided that the shaft already protrudes under prestress from the pressure spring 4 into the knife window 14. In this position, the knife is pressed inward from the arrow direction 18 described above downward into the knife window 14 until the tip of the shaft 3 engages into the indentation 17 on the knife 9. The knife is now in its proper position. If the knife holder 10 is now bent vertically in the paper plane of FIG. 1 with a short jolt, it breaks off in the area of the predetermined breaking point 13 and leaves the knife behind installed in its proper place in the tool shaft 2.

Important here is that the position of the predetermined breaking point be selected in such a way that the rest of the predetermined breaking point 13 that remains on the knife 9 installed in the tool shaft 2 does not protrude obtrusively from the outer circumference of the tool shaft 2.

FIG. 1 shows further that the knife can be installed not only from above in the direction of the arrow 18, but also opposite the drawn arrow direction 18. Thus it can be slid into the knife window from the underside in the opposite direction from the arrow 18.

Referring to FIG. 3, two knife holders 10 and 10a can be located on the cutting knife 9, each of which is attached to the cutting knife 9 over a predetermined breaking point. The two knife holders 10 and 10a lie opposite one another and are preferably aligned to each other. The cutting knife 9 can be installed by gripping the rear knife holder 10 and inserting the forward knife holder 10a into and through the recess 14 in the tool shaft 2 in the insertion direction 18. The forward knife holder 10a emerges on the other side of the tool shaft 2 and can be gripped by a user to further manipulate the cutting knife 9. Once the cutting knife 9 is properly positioned the two knife holders 10 and 10a are broken off.

It his further pointed out that here only the replacement of a single knife is drawn, whereas there are of course tools in which a variety of different knives must be replaced, which is possible with the same procedure. The procedure consists mainly of bringing the cutting knife into its proper position in the tool with the help of the knife holder as a manipulation aid, in order then to break away the knife holder 10.

FIG. 4 shows that the knife holder 10 is attached to the sides opposite the cutting edges 11 and floating radius 12 of the knife 9 over the predetermined breaking point 13.

It can also be provided in another embodiment that the knife holder 10 is connected to the knife 9 in the area of the floating radius 12 with a predetermined breaking point 13, or in a further embodiment that the knife holder 10 is connected to the base 16 of the knife 9 over a predetermined breaking point.

Depending on the situation of use, it can also, of course, be provided that the knife holder 10 is connected to the knife over a predetermined breaking point with a laterally abutting face 19.

FIGS. 3 and 5 show that the predetermined breaking point 13 is achieved through a material-weakening constriction in the metal material of the cutting knife. It is preferred that the knife holder 10 and the cutting knife consist of the same material. However, it can be provided that the knife 9 is hardened, while, for example, the knife holder 10 is not, because it is excluded from the hardening process for the purpose of cost savings.

In another embodiment of the present invention it is specified that the predetermined breaking point 13 not be formed by a constriction according to FIGS. 5 and 4, but by another material-weakening permeation in the area of the predetermined breaking point. Such a permeation can be a material-weakening drilled hole 13a, e.g., that penetrates the joint centrically or acentrically between the knife holder 10 and the knife 9, to create at this place a material-weakening cross-section that then later forms the predetermined breaking point 13, as shown in FIG. 3.

FIG. 7 additionally shows that the knife window 14 preferentially has a key face 15 in order to ensure that the knife 9 can be slid only into a specific, correct position in the knife window 14 and that other positions are thereby not possible. This ensures that even small knives of approximately 2 mm can be slid into the proper position in the knife window 14 without visual inspection, after which, according to FIG. 1, the knife holder 10 is broken away and the knife 9 is then held in its proper position in the tool shaft 2 and is ready for work.

All aforementioned mounting possibilities (cutting head, rear side, laterally to the rear—right or left) for the knife holder to the body of the cutting knife, whether alone or in combination, are claimed as significant to the invention.

KEY TO DRAWINGS 1. base body
2. tool shaft
3. spike
4. pressure spring
5. clamping screw
6. threaded pin
7. eccentric tappet
8. roll pin 9. knife
10. knife holder
11. cutting edge
12. floating radius
13. predetermined breaking point
14. knife window
15. key face
16. base
17. indentation
18. direction of arrow
19. abutting face

The invention claimed is:

1. A cutting knife of a size which is difficult to manipulate with a bare hand and which is adapted for use with a chip-removing cutting tool, the cutting knife adapted to be replaceably held in a knife window of a rotary-driven tool shaft of a base body of the cutting tool, wherein at least one knife holder is connected to the cutting knife over a predetermined breaking point, and is configured to be grasped by the bare hand to assist with manipulation of the cutting knife, and is further configured to be broken off of the cutting knife at the breaking point and discarded once the cutting knife has been positioned in the knife window and prior to use of the cutting knife, thereby eliminating any need for a grasping tool to manipulate the cutting knife, the cutting knife further including an indentation in an upper edge thereof and between a cutting edge of the cutting knife and the breaking point, which is adapted to receive a tip of a spring biased pin in the tool shaft for securing the cutting knife in the knife window.

2. Cutting knife according to claim 1, wherein the cutting knife is adapted to be replaceably held in a radially oriented knife window of the rotary-driven tool shaft of the base body of the cutting tool.

3. Cutting knife according to one of the claim 1 or 2 wherein the position of the predetermined breaking point is selected in such a way that the rest of the predetermined breaking point that remains on the knife installed in the tool shaft does not protrude obtrusively from an outer circumference of the tool shaft.

4. Cutting knife according to one of the claim 1 or 2 wherein the knife has a pair of cutting edges and the knife holder is attached to a side of the knife opposite the cutting edges of the knife over the predetermined breaking point.

5. Cutting knife according to one of the claim 1 or 2, wherein the knife has a floating radius and the knife holder is attached to a side of the knife opposite the floating radius over the predetermined breaking point.

6. Cutting knife according to one of the claim 1 or 2, wherein the knife has a base and the knife holder is attached to the base of the knife over the predetermined breaking point.

7. Cutting knife according to one of the claim 1 or 2 wherein the predetermined breaking point is formed through a material-weakening constriction in the metal material of the cutting knife.

8. Cutting knife according to one of the claim 1 or 2 wherein the predetermined breaking point is formed through a material-weakening drilled hole in a joint between the knife holder and the knife.

9. Cutting knife according to one of the claim 1 or 2, wherein two knife holders are attached to the knife.

10. Cutting knife according to claim 9, wherein both knife holders are located in alignment with one another in a common plane and one knife holder extends forwardly relative to the cutting knife and the other knife holder extends rearwardly relative to the cutting knife.

11. Procedure for fastening a cutting knife in a chip-removing cutting tool, in which a relatively small knife of a size which is difficult to manipulate with a bare hand is held in a knife window of a tool shaft of a base body of the cutting tool, wherein the cutting knife is provided with at least one knife holder attached over a predetermined breaking point, the knife holder which serves as a manipulation aid is grasped with the bare hand to insert the cutting knife into the knife window of the tool shaft, the cutting knife is secured in the knife window with a cutting knife securing mechanism, and after the cutting knife is secured in the knife window, a short press is made on the knife holder which stresses the predetermined breaking point by bending it until it breaks and the knife holder is removed as refuse.

12. The procedure of claim 11 wherein the cutting knife is a deburring knife.

13. A method of securing a cutting knife in a chip removing cutting tool comprising the steps of:
   providing the cutting tool, the cutting tool having an axially rotary driven base body, a tool shaft secured in the base body, a radially directed knife window in the tool shaft, and a mechanism for securing the cutting knife in the knife window,
   providing the cutting knife, the cutting knife having a discardable knife holder attached thereto over a predetermined breaking point,
   grasping the knife holder with a bare hand and inserting the cutting knife into the knife window,
   actuating the mechanism for securing the cutting knife in the knife window to thereby secure the cutting knife in the knife window,
   pressing on the knife holder to stress the predetermined breaking point until the knife holder breaks off of the cutting knife, and
   discarding the knife holder.

14. The method of claim 13 wherein the mechanism for securing the cutting knife in the knife window is a spring biased pin in the tool shaft, wherein the cutting knife further includes an indentation in an upper edge thereof, and wherein the step of actuating the mechanism for securing the cutting knife in the knife window comprises positioning a tip of the spring biased pin in the indentation in the cutting knife.

15. The method of claim 13 wherein the cutting knife is a deburring knife.

16. A chip removing cutting tool and cutting knife comprising:
   an axially rotary driven base body, a tool shaft secured in the base body, a radially directed knife window in the tool shaft, and a mechanism for securing the cutting knife in the knife window,
   the cutting knife positioned in the knife window and secured in the knife window with the mechanism for securing the cutting knife in the knife window,
   the cutting knife having a discardable knife holder attached thereto over a predetermined breaking point which permits the knife holder to be grasped with a bare hand and the cutting knife to be inserted into the knife window,
   whereupon after the cutting knife is inserted into the knife window and secured in the knife window the knife holder can be pressed to stress the predetermined breaking point until the knife holder breaks off of the cutting knife, at which time the knife holder can be discarded.

17. The chip removing cutting tool and cutting knife of claim 16 wherein the cutting knife has a pair of cutting edges and a floating radius between the cutting edges on one end of the cutting knife, and wherein the predetermined breaking point is on the other end of the cutting knife.

18. The chip removing cutting tool and cutting knife of claim 16 wherein the mechanism for securing the cutting knife in the knife window comprises a spring biased pin in the tool shaft, and wherein the cutting knife further includes an indentation in an upper edge thereof which receives a tip of the spring biased pin to secure the cutting knife in the knife window.

19. The chip removing cutting tool and cutting knife of claim 16 wherein the cutting knife is a deburring knife.

* * * * *